W. G. PANCOAST.
VEGETABLE MASHER.
APPLICATION FILED OCT. 13, 1915.
1,219,580.
Patented Mar. 20, 1917.
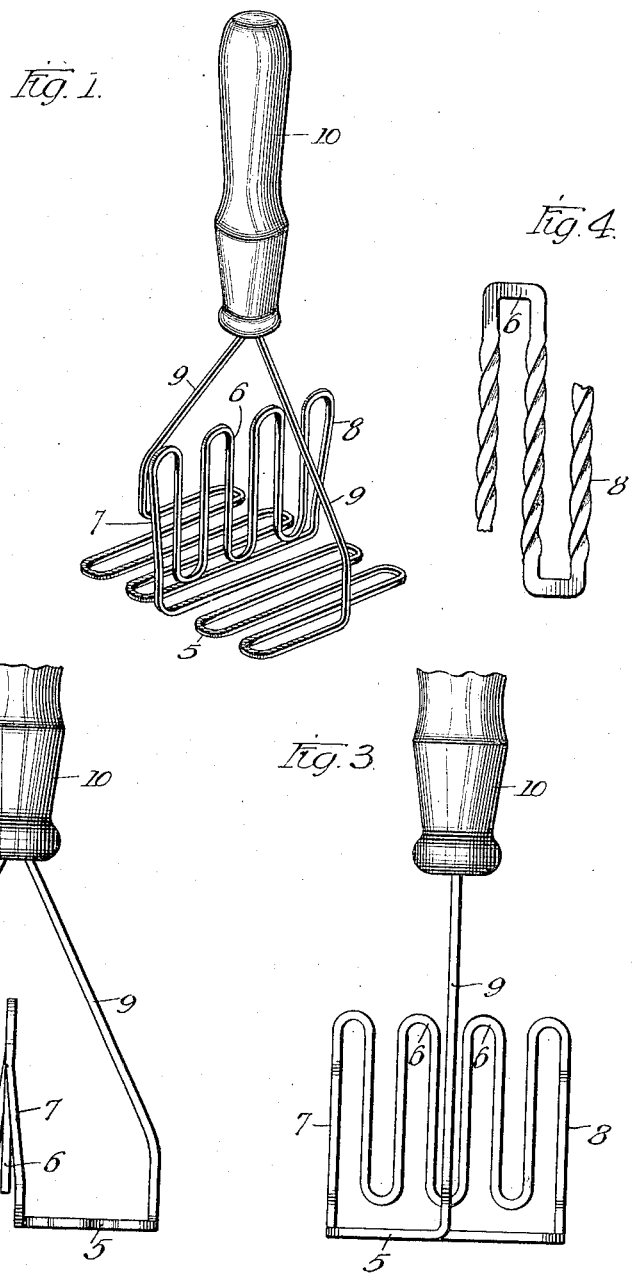

UNITED STATES PATENT OFFICE.

WILLIAM G. PANCOAST, OF CHICAGO, ILLINOIS.

VEGETABLE-MASHER.

1,219,580.  Specification of Letters Patent.  Patented Mar. 20, 1917.

Application filed October 13, 1915. Serial No. 55,623.

*To all whom it may concern:*

Be it known that I, WILLIAM G. PANCOAST, a citizen of the United States, residing at Chicago, county of Cook, and State of Illinois, have invented certain new and useful Improvements in Vegetable-Mashers, of which the following is a specification.

My invention relates to a device the primary object of which is to mash vegetables and which may be used as a beater after the vegetables have been mashed or during the mashing process of the same.

In the proper preparation of cooked vegetables that are adapted to be mashed it is first necessary to break up the vegetables whereupon such vegetables as potatoes must be beaten or stirred in order to make them light and of the desired consistency. To these ends I have devised a masher that is provided with a mashing surface which will readily break up the vegetables and which is also provided with a beating or stirring surface disposed at substantially right angles to the mashing surface whereby the vertical movement of the device mashes the vegetables and a rotary movement effects the beating; the two movements being preferably alternately produced during the mashing process.

A further object of the invention is to provide a vegetable masher which is strong, simple in construction, and having cutting edges upon both the mashing and beating surfaces so as to render it easily operable and efficient in its work.

In the accompanying drawing

Figure 1 is a perspective view of my improved vegetable masher;

Fig. 2 is a side view of Fig. 1;

Fig. 3 is an end view of Fig. 1, and

Fig. 4 is a fragmentary view of a modified form.

In the preferred form of construction the device comprises a single piece of wire that is square in cross section and which is sinuously bent to form a horizontally disposed mashing member or surface 5 and a vertically disposed stirring or beating member 6 also sinuously bent and at substantially right angles to the mashing member and located centrally thereof.

In constructing the device the vertical member 6 is first sinuously bent to form a plurality of loops and the outer sections 7 and 8 of the end loops are slightly offset from the plane of the other loop sections and the wire is then bent to form the horizontal members 5 upon both sides of the vertical member 6. When a sufficient number of loops have been formed to constitute the horizontal mashing member the wire is then bent upwardly and thence inwardly, the two ends 9 of the wire meeting above the vertical member and centrally thereof, and are secured to a handle 10 in any suitable manner.

It is to be noted that by forming the device of wire that is substantially square in cross section the corners of the wire form cutting edges and also render the structure more durable and rigid than if formed of round wire.

As a device of this character must be relatively light and yet sufficiently strong to withstand considerable strain I have provided for strength and lightness not only by constructing the same of square wire but also offset the end wires 7 and 8 from the plane of the other wire sections in the vertical member and as the ends 7 and 8 are offset upon opposite sides the vertical member is more substantially braced and therefore able to better resist the side thrusts and strains to which it is subjected.

I do not wish it to be understood that, in its broadest aspect, my invention is limited to a construction that is formed of square wire as it is obvious that round wire might be employed and that wire having other shapes than square in cross section might also be used to obtain the advantage of a cutting edge. The cutting efficiency may be increased by twisting a square wire, as shown in Fig. 4. Therefore without confining myself to the particular details of construction herein shown and constituting the most efficient form of structure,

I claim:

1. A vegetable masher comprising a single piece of wire-like material, square in cross section, sinuously bent to form a mashing member and a stirring member, said members lying in planes at right angles to each other, a handle and means connecting one of said members to said handle.

2. A vegetable masher comprising a single piece of twisted wire-like material, square in cross section, sinuously bent to form a mashing member and a stirring member, said members lying in planes at right angles to each other, a handle and means connecting one of said members to said handle.

3. A vegetable masher comprising a single piece of wire-like material sinuously bent to form a plurality of horizontally disposed loops and a plurality of vertically disposed loops centrally disposed relative to said horizontal loops, the end sections of said vertically disposed loops being deflected from the vertical plane of the remaining loop sections and in opposite directions, the end sections of said horizontal loops being bent upwardly and inwardly and a handle secured to the free ends of said end sections.

WILLIAM G. PANCOAST.

Witnesses:
 SADIE M. RYAN,
 AVIS S. HERNIMAN.

Copies of this patent may be obtained for five cents each, by addressing the "Commissioner of Patents, Washington, D. C."